United States Patent
Lorusso

(10) Patent No.: US 11,602,900 B2
(45) Date of Patent: Mar. 14, 2023

(54) SYSTEM FOR CALIBRATING THE PARALLELISM BETWEEN THE PRINTING PLANE AND THE VIRTUAL PLANE ON WHICH THE EXTRUDER OF A 3D PRINTER MOVES

(71) Applicant: ROBOZE S.P.A., Bari (IT)

(72) Inventor: Alessio Lorusso, Bari (IT)

(73) Assignee: ROBOZE S.P.A., Bari (IT)

(*) Notice: Subject to any disclaimer, the term of this patent is extended or adjusted under 35 U.S.C. 154(b) by 0 days.

(21) Appl. No.: 17/161,057

(22) Filed: Jan. 28, 2021

(65) Prior Publication Data
US 2021/0229367 A1    Jul. 29, 2021

(30) Foreign Application Priority Data
Jan. 28, 2020  (IT) .................. 102020000001639

(51) Int. Cl.
| | | |
|---|---|---|
| B29C 64/393 | (2017.01) |
| B33Y 10/00 | (2015.01) |
| B33Y 30/00 | (2015.01) |
| B33Y 50/02 | (2015.01) |
| B29C 64/118 | (2017.01) |
| B29C 64/245 | (2017.01) |

(52) U.S. Cl.
CPC .......... *B29C 64/393* (2017.08); *B29C 64/118* (2017.08); *B29C 64/245* (2017.08); *B33Y 10/00* (2014.12); *B33Y 30/00* (2014.12); *B33Y 50/02* (2014.12)

(58) Field of Classification Search
CPC ........ B33Y 50/02; B33Y 30/00; B29C 64/393
See application file for complete search history.

(56) References Cited

U.S. PATENT DOCUMENTS

| | | | |
|---|---|---|---|
| 2015/0130100 A1* | 5/2015 | Fiegener ............... | B29C 64/118 425/150 |
| 2017/0057171 A1 | 3/2017 | Chang et al. | |

FOREIGN PATENT DOCUMENTS

| | | |
|---|---|---|
| CN | 108311698 | 7/2018 |
| EP | 2 902 175 | 8/2015 |

OTHER PUBLICATIONS

Italian Search Report and Written Opinion for IT Application No. 102020000001639 dated Sep. 30, 2020, 11 pages.

* cited by examiner

*Primary Examiner* — Joseph S Del Sole
*Assistant Examiner* — Jamel M Nelson
(74) *Attorney, Agent, or Firm* — Nixon & Vanderhye

(57) ABSTRACT

An automatic calibration system for calibrating the parallelism between a printing plane of a 3D printer and a virtual plane on which the extruder of the 3D printer moves, to align the printing plane with the virtual plane on which the extruder moves, includes: at least one extruder, or a printing head on which the extruder itself is mounted, movable on a horizontal plane; at least one device for measuring the distance of the printing plane associated with the extruder or with a printing head; a movable printing plane along the vertical axis Z, the plane being equipped with at least three non-aligned actuators, which are controllable and operable independently of each other; a central control unit (MCU or PLC) of the calibration system and of all the parts thereof.

14 Claims, 4 Drawing Sheets

SYSTEM FOR CALIBRATING THE PARALLELISM BETWEEN THE PRINTING PLANE AND THE VIRTUAL PLANE ON WHICH THE EXTRUDER OF A 3D PRINTER MOVES

CROSS-REFERENCE TO RELATED APPLICATIONS

This application claims priority to Italian Patent Application No. 102020000001639 filed Jan. 28, 2020, the entire contents of which are hereby incorporated by reference.

BACKGROUND OF THE INVENTION

Field of the Invention

In the field of professional or industrial high-precision 3D printers, it is very important to ensure the actual parallelism between the printing plane, on which the material exiting the extruder is deposited, and the actual plane on which said extruder moves. Usually, but not necessarily, the printing plane and the plane on which the extruder or the printing head moves are horizontal.

Description of the Related Art

The more these two planes are misaligned (i.e., they are not parallel), the more imprecise the printing of the three-dimensional object will be.

The arrangement, and therefore the orientation, in the space of the horizontal plane XY is determined at the time of the construction of the printer, while the arrangement in the space of the movable printing plane along the vertical axis Z may instead vary over time due to various factors, including thermal expansions and/or mechanical deformations and/or constructional inaccuracies of the plane itself.

SUMMARY OF THE INVENTION

It is the main object of the present invention to solve or reduce the effects of this issue by means of a calibration system which allows to align the printing plane to the virtual plane on which the extruder moves.

This has been achieved, according to the invention, by providing an automatic calibration system which includes at least one device for measuring the distance of the printing plane associated with the extruder or with the printing head on which the extruder itself is mounted and a movable printing plane along the vertical axis Z, the plane being provided with at least three non-aligned actuators, which are controllable and operable independently of each other, as well as a central control unit (MCU or PLC) of the calibration system.

The calibration system is advantageously applicable to 3D printers with 3 or more screws for the movement along the axis Z.

A better understanding of the invention will be achieved by means of the following detailed description and with reference to the accompanying drawings, which show a preferred embodiment thereof given by way of non-limiting example.

DESCRIPTION OF THE PREFERRED EMBODIMENTS

As already mentioned, the invention substantially relates to a system for calibrating the parallelism between the real printing plane and the virtual plane on which the extruder of a 3D printer moves, in which means for implementing an algorithm are provided, the purpose of which is precisely to ensure a correct parallelism between the real plane on which the processing is performed and the virtual horizontal plane defined by the extruder (or by the printing head associated therewith) moving along the axes X and Y in any condition and also taking into account any thermal expansion or mechanical deformation.

Said real printing plane is arranged horizontally and is movable along the vertical axis Z, while the axes X and Y are perpendicular to each other and to the axis Z. In the case of 3D printing, the aforesaid processing consists in depositing material on said real printing plane.

The calibration system according to the invention comprises:

A substantially horizontal processing plane (P), movable along a vertical axis (Z), preferably rectangular or square;

Moving means (A-ZB, A-ZR, A-ZL) of said processing plane (P), arranged in three non-aligned points of the plane itself and operable each independently of the other two;

A sensor (S-DP) for measuring the distance between the plane (P) and the sensor itself.

Figure 1:
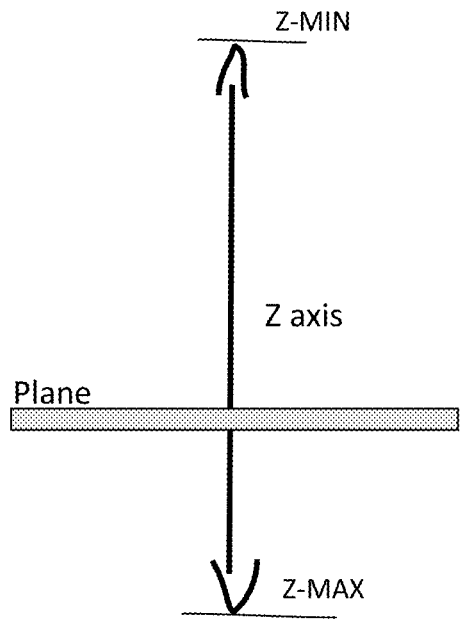
FIGS. 1 and 2 show the distances within which the printing plane moves and the positions of the actuators and of the calibration reference points.
Figure 2:
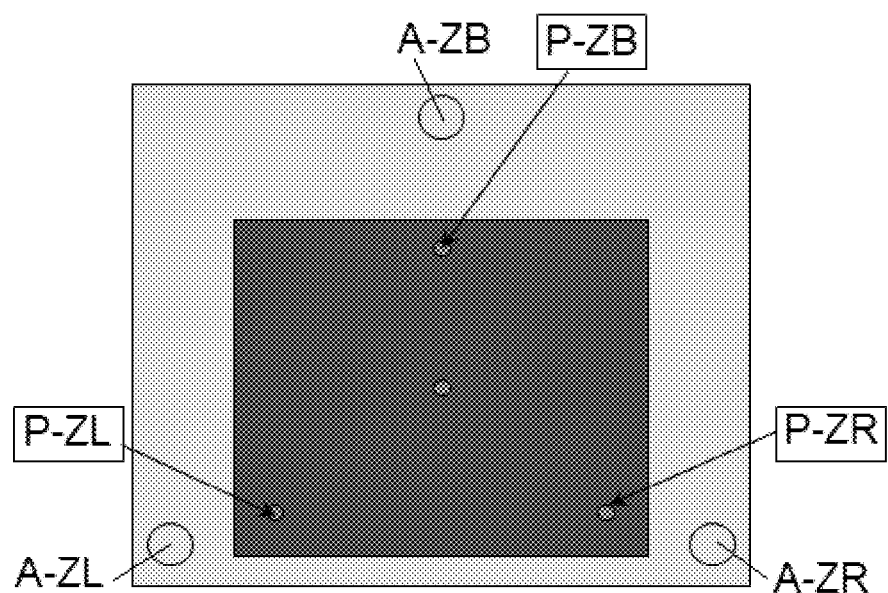

In the embodiment which is described (FIG. 2), said moving means (A-ZB, A-ZR, A-ZL) are preferably arranged: in the center of the rear side of the plane, at the far right of the front side and at the far left of the front side. Furthermore, being operable independently of each other, they are adapted to incline the plane (P) in all directions, according to the requirements, even slightly deforming the plane itself. Such moving means may include, for example, actuators which move the plane (P) upwards or downwards, i.e., towards Z-MIN or Z-MAX, as shown in FIG. 1.

The sensor (S-DP) for measuring the distance from the plane (P) may be optical, mechanical, electro-mechanical, or another type, and is fixed in height with respect to the vertical axis Z, and is configured to measure directly or indirectly the distance (DP) between the position thereof and the surface of the plane (P).

Figure 3:
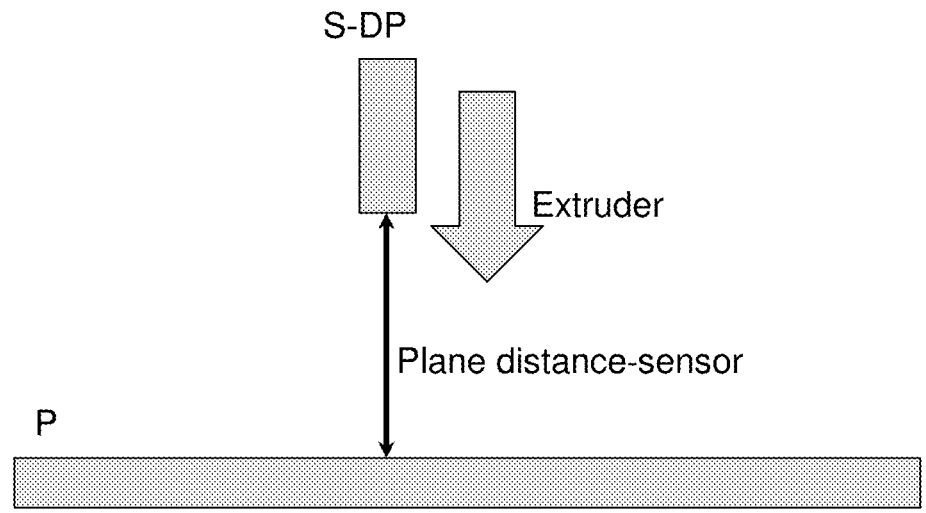
FIG. 3 shows a diagram of the sensor for measuring the distance from the plane.

In a preferred embodiment, described purely by way of non-limiting example, such a sensor is preferably installed on the head of the horizontally movable extruder (FIG. 3).

An example of how the automatic calibration procedure to align the printing plane (P) to the virtual plane on which the extruder moves, so that the two planes are substantially parallel to each other, will be described below in detail.

As already mentioned, the printing plane (P) of a 3D printer is a plane which is vertically movable along the Z axis, both upwards and downwards, starting from the maximum point (Z-MAX), i.e., the furthest point from the extruder which is reachable by the printing plane, to the minimum point (Z-MIN) reachable from the printing plane itself, i.e. the point which can go beyond the zero of the extruder (i.e. above the extruder tip).

Figure 4:
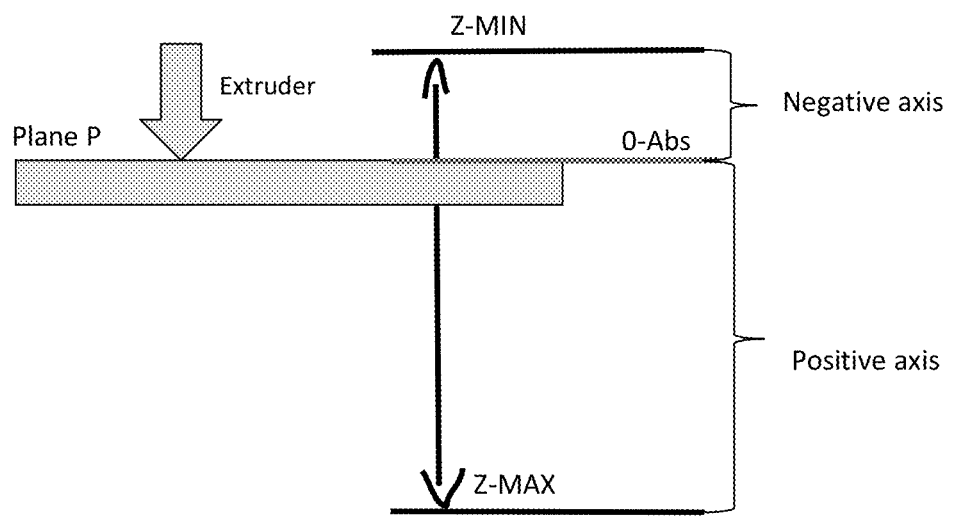
FIGS. 4 to 7 show diagrams of the coordinates used in the procedure for calibrating the printing plane with respect to the virtual plane on which the printing head and the relative extruder move, as well as any irregularities of the printing plane.

The absolute zero (0-Abs) corresponds to the absolute coordinate along the axis Z whereby the surface of the printing plane "skims" (maximum error of +0.015 mm) the tip of the extruder or of another processing device (FIG. 4).

Figure 5:
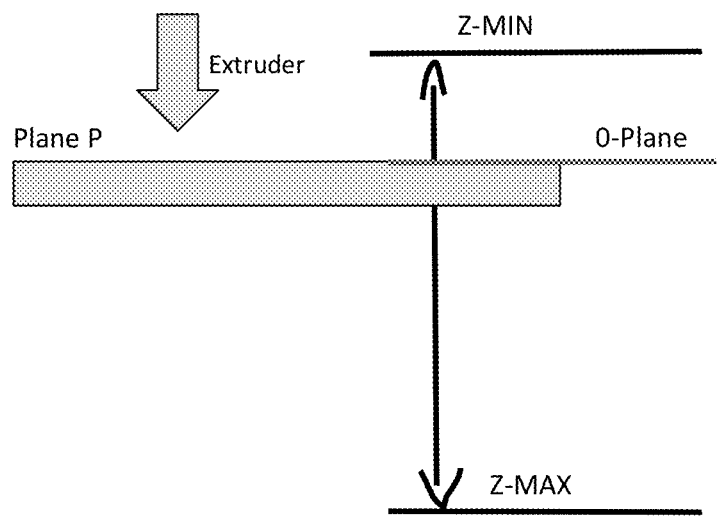

The zero plane (0-Plane) corresponds to the absolute coordinate of the surface of the printing plane; it is worth noting that this coordinate is always known and is the coordinate which is defined on the machine along the axis Z (FIG. 5).

Figure 6:
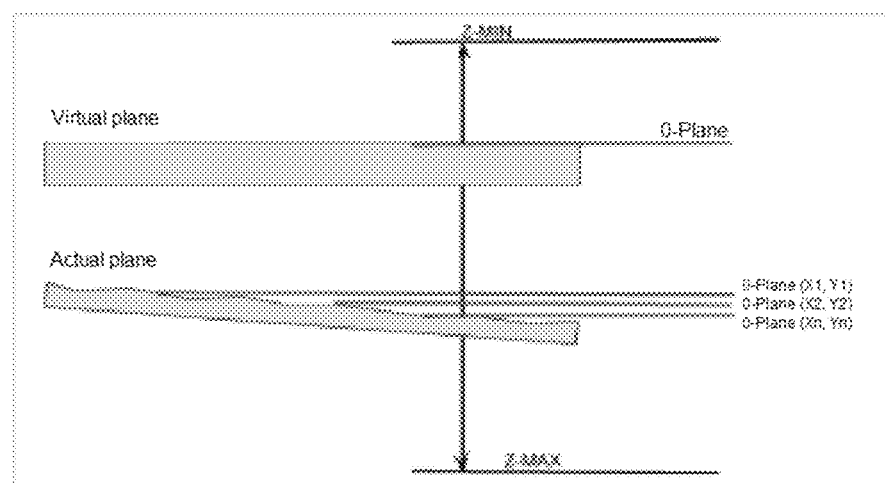

What has been described above applies to a "theoretical" printing plane which is perfectly flat and perfectly parallel to the virtual plane described by the extruder which moves on the axes X and Y. In reality, this is never true and therefore, in the "real" printing plane, the coordinate Z of the 0-plane point varies according to the coordinates X, Y in which the measurement is taken (FIG. 6).

Before proceeding with the description of the calibration procedure, it is important to note that such a procedure is useful for the purposes of 3D printing with the extruder with which the measurement sensor (S-DP) is associated. For this reason—even if it is not strictly necessary for the calibration of the printing plane—it is also preferable carrying out a calibration of the extruder to determine the actual position of the extruder end, i.e., the coordinate Z of the tip of the nozzle, from which the material which is deposited on the printing plane comes out.

Figure 7:
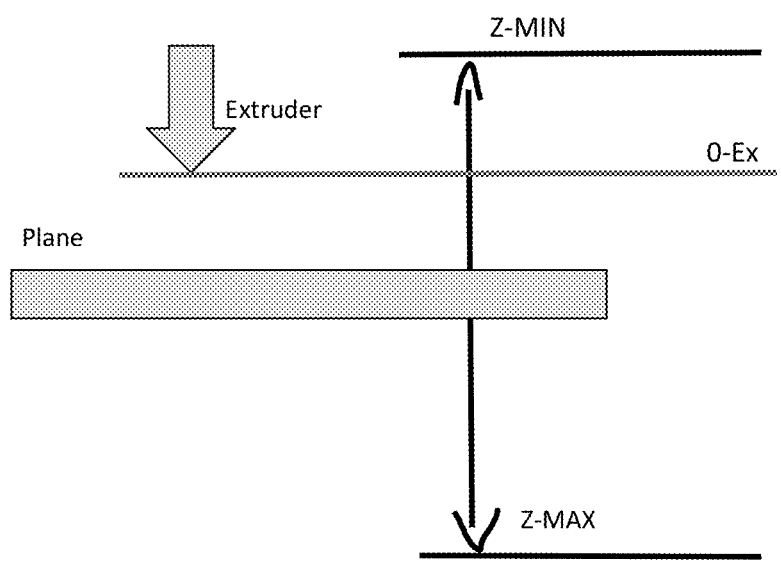

The extruder zero (0-Ex) corresponds to the absolute coordinate along the axis Z of the extruder tip (FIG. 7).

The term "calibration of the extruder" means the procedure which, at least in a single point of the printing plane, makes the 0-Plane (which is specific to the calibration point) correspond to the 0-Ex, consequently coinciding with the 0-Abs.

For the sake of completeness of description, it should be noted that the resetting calibration of the extruder is the procedure which, at least in a single calibration point of the plane, moves the plane along the vertical axis Z to make the 0-Plane (which is specific to the calibration point) correspond to the 0-Ex and, consequently, to the 0-Abs.

Such a procedure, which determines the actual position of the extruder tip in the vertical direction, may be performed in various known manners.

From the operational point of view, the printing surface distance sensor may be a probe mounted directly on the extruder support, integral therewith. Such a probe requires a physical movement of the extruder—of a known distance—which is sufficient to operate the probe itself so that the latter sends the signal to a central control unit (MCU or PLC) which manages the entire machine. Such a control unit is preferably integrated in the 3D printer but could also be separate from and in constant operational connection with it.

Procedure for Calibrating the Printing Plane

It is the object of such a calibration to correct any inclinations of the printing plane, with respect to the virtual plane on which the extruder and the 3D printing head move, caused by thermal expansions or malfunctions or errors in the movement of the plane itself along the vertical axis Z.

Such a procedure comprises the following steps:
1) Possibly calibrating the extruder in the central point of the printing plane;
2) Moving the printing head on the point P-ZB;
3) Detecting the absolute coordinate (Offset P-ZB) of the point P-ZB, preferably by probing;
4) Moving the printing head on the point P-ZR;
5) Detecting the absolute coordinate (Offset P-ZR) of the point P-ZR, preferably by probing;
6) Moving the printing head on the point P-ZL;
7) Detecting the absolute coordinate (Offset P-ZL) of the point P-ZL, preferably by probing;
8) Operating the actuator A-ZR for a movement equal to the difference Offset ZB-Offset ZR;
9) Operating the actuator A-ZL for a movement equal to the difference Offset ZB-Offset ZL;
10) Verifying if the extent of at least one of the two movements referred to in steps 8) and 9) is greater than 0.08 mm: if so, the procedure is repeated from step 2) otherwise it may advance to the following step;
11) Possibly re-calibrating the extruder in the central point of the printing plane;
12) End of method.

According to what has been said, it is clear that during the calibration of the plane, differences in the absolute measurements are exploited, and this means that any error with respect to the Zero extruder would be equally reflected on all measurements and on all 3 probing points: advantageously, this would not result in any errors in the calibration of the plan. Such a concept is also exploited when the processing is performed only in a restricted area of the printing plane (usually central, but in any case an area which does not comprise the three probing points) and a film or any object—flat or non-flat—on which the 3D printing material is expected to be deposited, is to be applied on the surface itself: in the second case, in which the printing occurs on an object which is not flat and is integral to the printing plane, the geometry, position and tolerances of such an object must be known and taken into account in the software which manages the movements of the extruder and of the printing plane.

Another advantageous aspect of the invention is given by the fact that during the calibration of the plane only one of the 3 measuring points is used as a reference. Such a point (in the example described, it is the point P-ZB in the center of the rear side of the printing plane), requires a greater positioning reliability. For this reason, the actuator A-ZB is provided with a brake which is operated during steps 8) and 9) of the calibration to avoid any movement due to the inclination of the plane.

Finally, it should be noted that the calibration of the printing plane described so far, in order to modify the structure of the printing plane, to make it parallel to the virtual plane on which the extruder for 3D printing moves, may be performed—without modifications and with the same advantages—both hot and cold. In other words, the present invention is advantageously applicable to all types of 3D printers, including hot chamber ones, which may be affected by significant thermal deformations.

It is apparent that many adjustments, adaptations, integrations, variations, and replacements of elements with others which are functionally equivalent can be made to the embodiment and variants thereof described above by way of non-limiting example, without however departing from the scope of protection of the following claims.

The invention claimed is:

1. An automatic calibration system for calibrating the parallelism between a printing plane (P) of a 3D printer and a virtual plane on which the extruder of said 3D printer moves, to align the printing plane (P) with the virtual plane on which the extruder moves, the system comprising:
   at least one extruder, or a printing head on which the extruder itself is mounted, movable on a horizontal plane;
   at least one device for measuring the distance of the printing plane (P) associated with the at least one extruder or with the printing head, the at least one device comprising a sensor (S-DP) for measuring a vertical distance between the printing plane (P) and the sensor itself in at least three non-aligned points;
   at least three non-aligned actuators configured to move the printing plane (P) along the vertical axis (Z), the at least three non-aligned actuators being controllable and operable independently of each other;
   a central control unit (MCU or PLC) of the calibration system and of all the parts thereof, on which a software is implemented which also manages the movements of the at least one extruder and of the printing plane (P),
   wherein said central control unit (MCU or PLC) provides means for implementing an algorithm configured to ensure correct parallelism between the printing plane (P) on which the processing is performed and the virtual horizontal plane defined by the at least one extruder or by the printing head associated therewith, movable along the axes X and Y in any condition, also taking into account thermal expansions and mechanical deformations, and
   wherein said printing plane (P) including three moving means (A-ZB, A-ZR, A-ZL) arranged in three non-aligned points of said printing plane (P) itself, each of the three moving means (A-ZB, A-ZR, A-ZL) operatable independently of the other two moving means (A-ZB, A-ZR, A-ZL) to incline the printing plane (P) in all directions, according to requirements, even deforming the printing plane (P) itself to ensure the correct parallelism between the printing plane (P) and the virtual horizontal plane defined by the at least one extruder or by the printing head associated therewith and in which the at least one extruder or by the printing head moves while taking into account any thermal expansions and any mechanical deformations.

2. The calibration system according to claim 1, wherein said moving means (A-ZB, A-ZR, A-ZL) are arranged respectively: in the center of the rear side of the printing plane (P), at the far right of the front side and at the far left of the front side.

3. The calibration system according to claim 2, wherein the sensor (S-DP) for measuring the distance from the printing plane (P) may be optical, mechanical, electromechanical, or another type, adapted to the purpose, and is fixed in height with respect to the vertical axis Z, and is configured to directly or indirectly measure the distance (DP) between the position thereof and the surface of the printing plane (P).

4. The calibration system according to claim 2, wherein said distance measuring sensor (S-DP) is installed on the head of the horizontally movable extruder.

5. The calibration system according to claim 2, wherein in the event that the printing occurs on an object which is not flat and is integral with the printing plane, said software managing the movements of the extruder and of the printing plane implemented in said central control unit (MCU or PLC) is configured to take into account the geometry, position and tolerances of such object.

6. The calibration system according to claim 2, wherein said moving means comprise actuators for moving the printing plane (P) upwards or downwards at each of the actuators, including to deform the printing plane (P).

7. The calibration system according to claim 6, wherein the sensor (S-DP) for measuring the distance from the printing plane (P) may be optical, mechanical, electromechanical, or another type, adapted to the purpose, and is fixed in height with respect to the vertical axis Z, and is configured to directly or indirectly measure the distance (DP) between the position thereof and the surface of the printing plane (P).

8. The calibration system according to claim 6, wherein said distance measuring sensor (S-DP) is installed on the head of the horizontally movable extruder.

9. The calibration system according to claim 6, wherein in the event that the printing occurs on an object which is not flat and is integral with the printing plane, said software managing the movements of the extruder and of the printing plane implemented in said central control unit (MCU or PLC) is configured to take into account the geometry, position and tolerances of such object.

10. The calibration system according to claim 1, wherein the sensor (S-DP) for measuring the distance from the printing plane (P) may be optical, mechanical, electromechanical, or another type, adapted to the purpose, and is fixed in height with respect to the vertical axis Z, and is configured to directly or indirectly measure the distance (DP) between the position thereof and the surface of the printing plane (P).

11. The calibration system according to claim 10, wherein said distance measuring sensor (S-DP) is installed on the head of the horizontally movable extruder.

12. The calibration system according to claim 1, wherein said distance measuring sensor (S-DP) is installed on the head of the horizontally movable extruder.

13. The calibration system according to claim 1, wherein in the event that the printing occurs on an object which is not flat and is integral with the printing plane, said software managing the movements of the extruder and of the printing plane implemented in said central control unit (MCU or PLC) is configured to take into account the geometry, position and tolerances of such object.

14. The calibration system according to claim 1, wherein the substantially horizontal processing plane is rectangular or square.

* * * * *